United States Patent [19]

Christensen et al.

[11] Patent Number: 5,710,886
[45] Date of Patent: Jan. 20, 1998

[54] ELECTRIC COUPONING METHOD AND APPARATUS

[75] Inventors: Scott N. Christensen, Omaha, Nebr.; David D. Ingwersen, Scottsdale, Ariz.

[73] Assignee: SellectSoft, L.C., Phoenix, Ariz.

[21] Appl. No.: 491,367

[22] Filed: Jun. 16, 1995

[51] Int. Cl.[6] .................................................. G06F 151/00
[52] U.S. Cl. .................................... 395/214; 395/201
[58] Field of Search ...................................... 395/201, 214; 366/479.07; 235/381, 385; 186/52, 55–56

[56] References Cited

U.S. PATENT DOCUMENTS

| 5,128,752 | 7/1992 | Von Kohorn | 358/84 |
| 5,305,195 | 4/1994 | Murphy | 364/401 |
| 5,305,197 | 4/1994 | Axler et al. | 364/401 |
| 5,353,218 | 10/1994 | DeLapa et al. | 364/401 |
| 5,502,636 | 3/1996 | Clarke | 395/214 |

OTHER PUBLICATIONS

"U.P.C. Coupon Code Guidelines Manual," Uniform Code Council, Inc. 8163 Old Yankee Road, Suite J, Dayton, OH 45458, pp. 1;30–39, Sep. 1994.
Advertisement: "Online Coupon Delivery" *New York Times*, Business Section, Jun. 21, 1995.
Brochure: "Coupons Online" A Division of Interactive Database Marketing Company. 271 Madison Avenue, Suite 1005, New York, NY 10016.
Fawcett, Adrianne Ward "Trading Scissors for Modems", *Advertising Age*, Jun. 6, 1995.

*Primary Examiner*—Gail O. Hayes
*Assistant Examiner*—Frantzy Poinvil
*Attorney, Agent, or Firm*—Robert Platt Bell & Associates, P.C.

[57] ABSTRACT

A method and apparatus for distributing, generating, and redeeming discount coupons, rebate or gift certificates or the like tracks each coupon using a consumer ID number printed on the coupon. Coupons may be distributed electronically, for example, in the form of a diskette or CD-ROM software. Software on the diskette or CD-ROM may prompt a consumer to call a 1-800 number for a validation number or code. During the phone call, telemarketing personnel may request consumer demographic and or identification information which may be entered into a centralized database. Once the software is validated, a consumer may print out selected coupons displayed on a Graphical User Interface (GUI). Each coupon may be printed only a limited number of times. Each coupon may be imprinted with a consumer ID number, preferably in the form of a bar code. Once redeemed, consumer ID information and coupon information may be retrieved from coupons forwarded to a coupon clearing house. Accurate data may then be produced illustrating which consumers or groups of consumers are redeeming which coupons. Such data may be used for marketing purposes or to generated further diskettes for distribution targeting specific consumers or groups of consumers with specific classes of coupon offerings. The use of a consumer ID number on the coupon may reduce or prevent the fraudulent copying and redemption of coupons, as multiple redemptions of a single coupon by a consumer may be readily detected from data gathered at the brokerage clearing house.

19 Claims, 14 Drawing Sheets

ELECTRIC COUPONING METHOD AND APPARATUS

FIELD OF THE INVENTION

The present invention relates to an apparatus and method for distributing, generating, authenticating, and redeeming discount coupons and the like electronically. The method and apparatus of the present invention may also be used for tracking marketing data using electronic couponing techniques.

BACKGROUND OF THE INVENTION

Discount coupons and the like (e.g., "cents off" coupons, rebate coupons, special offer coupons, or the like, collectively referred to herein as "coupons") have become an integral part of marketing strategies for many products, particularly retail consumer goods, sundries, foodstuffs, hardware, clothing, and the like, typically sold at local grocery, drug, and discount stores. Product manufacturers have come to rely upon coupons, rebate and gift certificates or the like to promote new and existing products, boost sales, and obtain demographic information concerning consumer buying patterns. Consumers have come to rely upon coupons or certificates as a technique for reducing costs.

Prior art couponing techniques have had several disadvantages, not the least of which are low response rate and fraud. In the prior art, coupons may be distributed using direct mailing techniques, printed in newspapers, magazines, or the like, distributed with other commercial goods (e.g., laundry soap coupon packaged with washing machine), or distributed (e.g., by original equipment manufacturers or OEMs) with the same or like goods, computers or the like (e.g., "cents off" toward next purchase). Such techniques require massive amounts of printing and distribution, and historically have a low response rate (e.g., typically less than 2% of coupons distributed are redeemed). Thus, such mass-distribution techniques may not be cost effective, and are not environmentally friendly, due to the large amount of paper wasted.

Such low response rates may be due in part to the difficulty a consumer may have in maintaining, cataloging, and finding appropriate coupons before shopping. A particular consumer may have at his or her disposal only those coupons which have been sent to him or her and have been retained by the consumer. Moreover, since many coupons have expiration dates, a consumer may have to carefully catalog each coupon to insure that it is redeemed before such an expiration date occurs. Such techniques are time-consuming and cumbersome. Generally, only those consumers on a budget or those who use couponing as a hobby have sufficient time to maximize their use of available coupons. Busier and more affluent consumers may not believe that such coupon management techniques are cost effective. This latter group of consumers may represent a more desirable demographic for a product manufacturer to attract or track.

With the advent of double or even triple redemption couponing promotions provided by some retail stores (e.g., grocery store chain or the like) as well as generous cash rebate coupon promotions (i.e., gift certificates or the like), fraud had become an every increasing problem in coupon marketing. Color photocopiers may create coupons which are indistinguishable from originals. Unscrupulous consumers may use such copied coupons to purchase large numbers of items at reduced prices or fraudulently obtain rebates for products which were never purchased. Moreover, some unscrupulous retailer may conspire with coupon brokers to redeem large numbers of illicitly obtained or generated to defraud manufacturers.

As coupon discounts or rebates may be used for promotional purposes, the resulting net price to the consumer with such a discount may be less than the product manufacturer's wholesale price. A product manufacturer may offer such steep discounts in the hope of obtaining future sales at full retail prices. If a consumer uses a photocopied coupon for multiple purchases of a retail item, the product manufacturer may not obtain the desired repeat sales at full retail price, and the entire scheme of couponing may be defeated.

In addition, prior art couponing techniques have yielded little, if any, useful data to product manufacturers regarding who is redeeming such coupons. Consumer demographic data is invaluable to a product manufacturer in determining which products to target to particular consumer groups (e.g., through particular advertising venues). Moreover, such demographic data may be used to more efficiently distribute future coupons. In addition, information as to the buying habits (i.e., recency, frequency, and monetary value or RFM) and demographics of particular consumers or groups of consumers has a market value and such information may be sold or traded for a profit.

Various techniques have been tried to eliminate or reduce fraud, provide more convenient techniques for distributing coupons, and to better track consumer demographic data.

De Lapa et al., U.S. Pat. No. 5,353,218 discloses a focused coupon system. FIG. 6 of De Lapa et al. is most illustrative. De Lapa et al. discloses a system for distributing coupons with a machine readable code (barcode) containing both customer and coupon identifications. The consumer code may be replaced with a generic code used in a look-up table for coupon verification and information. The entire machine readable code may be captured and uploaded to a central database for determining coupon and consumer identification. The uploaded information may be used for marketing purposes (to determine which coupons to next send to the consumer) and/or for rebate purposes.

Although the system of De Lapa et al. attempts to provide a more focused distribution technique, the system still relies upon paper coupons being distributed to consumers. Consumers may throw out such mass mailings (i.e., "junk mail") without opening them. Moreover, the system relies upon the consumer supplying demographic information in a questionnaire or the like in order to be provided with the coupons. Moreover, since the coupons of De Lapa et al. are preprinted, coupon trading or copying may be more prevalent.

Furthermore, in De Lapa et al., no mechanism is present for capturing subsequent demographic information. In addition, as consumer data is captured at the store level, an additional mechanism may be required to upload such consumer information to a centralized database to capture consumer demographic information. Additional data processing hardware/software may be required at a retail store in order to process such data. Thus, retailers may be initially reluctant to invest in such a scheme.

In retailing, it may be essential to check out consumers in as little time as possible. Thus, if additional processing time is required during customer check-out to process the coupons of De Lapa et al. retailers may be less likely to accept adopt such technologies.

Moreover, under the scheme of De Lapa et al., there is no mechanism provided to insure that the individual who receives the coupons is the targeted individual. If a consumer moves to a new address, new occupants at the old address may receive and redeem coupons addressed to the consumer. Thus, target tracking data may be inaccurate or incomplete.

Murphy, U.S. Pat. No. 5,305,195, issued Apr. 19, 1994, discloses an interactive advertising system for on-line terminals. A series of remote terminals receive compressed and encoded video advertising signals which may be stored on an internal hard drive. The advertising videos are played, and a consumer may select products using the terminal. In FIG. 4, (Col. 7, lines 45–50) Murphy discloses that a printer may be provided for printing selected coupons.

The apparatus of Murphy may solve some of the problems associated with distributing coupons in paper form. However, The Murphy system appears to be more concerned with directing advertising information than collecting demographic information or distributing coupons. Thus, it does not appear that the apparatus of Murphy is equipped to process demographic information or reduce coupon fraud. Moreover, Murphy discloses his apparatus for use in college campuses, a limited and narrow consumer demographic.

Von Kohorn, U.S. Pat. No. 5,128,752, issued Jul. 7, 1992 discloses a system and method for generating and redeeming tokens selected from television data. Product information and authentication data may be transmitted and displayed on a television and a home printer. A viewer may select a coupon for printing and redeem the coupon at a retail store.

Von Kohorn does disclose a technique for reducing fraud (Col. 7, lines 16–38). However, it appears that these techniques require action at the retail level to verify that a coupon is indeed legitimate, including, in one embodiment, requesting identification credentials from the consumer. Such techniques may be intrusive and cumbersome to use in a retail establishment where a number of coupons may be redeemed at any given time.

Moreover, it does not appear in the system of Von Kohorn, which relies on broad-casting, does not target specific consumers with particular coupons. Rather, it appears that the coupons are distributed to all viewers equipped with the appropriate apparatus. Note that in FIG. 6 (Col. 9, lines 40–48) Von Kohorn discloses a technique for recording marketing data from consumer information encoded into the coupon.

Axler et al., U.S. Pat. No. 5,305,197, issued Apr. 19, 1994, discloses a coupon dispensing machine with feedback. A consumer kiosk is placed in a retail establishment or the like to display advertising (LED scroll) and allow customers to print out selected coupons. A proximity sensor detects the presence of customers near the apparatus.

The Axler device may solve some of the problems associated with paper distribution of coupons. However, it does not appear that the Axler device may retrieve any significant amount of consumer demographic data other than the number and type of coupons printed. Moreover, within the in-store environment, it may be difficult to enter such consumer data, particularly with the keypad disclosed by Axler. Thus, it does not appear that the Axler device may be suitably adapted to retrieve consumer demographic data.

A fundamental fault with the Axler device is that it does not appear to target or prior motivate customers with to visit a retailer with specific coupons. Rather, the in-store location of the Axler device may facilitate a consumer "targeting" a coupon. In other words, a consumer may make a number of product selections in a store and then visit the coupon kiosk of Axler to determine whether any purchases are subject to coupon discount or rebate. Thus, the fundamental goal of couponing—to motivate a consumer to purchase a product—may be compromised.

In addition, the kiosk of Axler may occupy valuable commercial retail space. In a retail store (e.g., supermarket or the like) even a few feet of shelving may be extremely valuable for displaying and containing retail merchandise. Product manufacturers may even pay "rent" to a retail establishment in the form of rebates or promotional fees in order to obtain prominent shelf space. Thus, a retail establishment may be loathe to give up such valuable space to a couponing kiosk. Moreover, it may be time consuming and frustrating for customers waiting in line to access the kiosk. Providing additional kiosks may be cost-prohibitive.

SUMMARY AND OBJECTS OF THE INVENTION

In a method and apparatus for distributing and generating coupons, a database is generated comprising at least a list of consumer names and addresses. A package of data for a selected group of consumers is generated for the consumers on the list. The package of data includes coupon data. The package of data is transmitted to the selected group of consumers from the list. Demographic and identification data received from a consumer from the selected group of consumers is then entered into the database. A validation code is then transmitted to the consumer's computer so as to allow the consumer's computer to generate a coupon from the coupon data in the package of data. A coupon is generated from the consumer's computer in response to a consumer selection, from the coupon data in the package of data. The coupon including a consumer identification number, is processed once the coupon has been redeemed, to retrieve the customer identification number and update the database to indicate whether a consumer has redeemed the coupon.

The package of data may be transmitted to a consumer's computer by diskette, on-line or dial-up. The number of times a consumer has redeemed a given coupon may be counted to indicate fraud if the number of times a coupon is redeemed by the consumer exceeds a predetermined amount. In response to information retrieved from redeemed coupons, a revised database may be generated and a new revised package of data for a revised selected group of consumers may be transmitted.

It is an object of the present invention to improve consumer response to coupon distribution campaigns.

It is a further object of the present invention to provide more accurate data of which consumers redeem particular coupons in a coupon distribution campaign.

It is a further object of the present invention to provide additional demographic data correlated to consumer and coupon redemption for a coupon distribution campaign.

It is a further object of the present invention to reduce the incidence of fraud in the redemption of coupons or copying of coupons.

It is a further object of the present invention to improve consumer response to a coupon campaign by targeting consumers with specific coupon product lines in response to demographic data generated from previous coupon campaigns.

These and other objects of the present invention will be realized in connection with the detailed description of the preferred embodiment set forth below.

BRIEF DESCRIPTIONS OF THE DRAWINGS

DETAILED DESCRIPTION OF THE INVENTION

Figure 5:
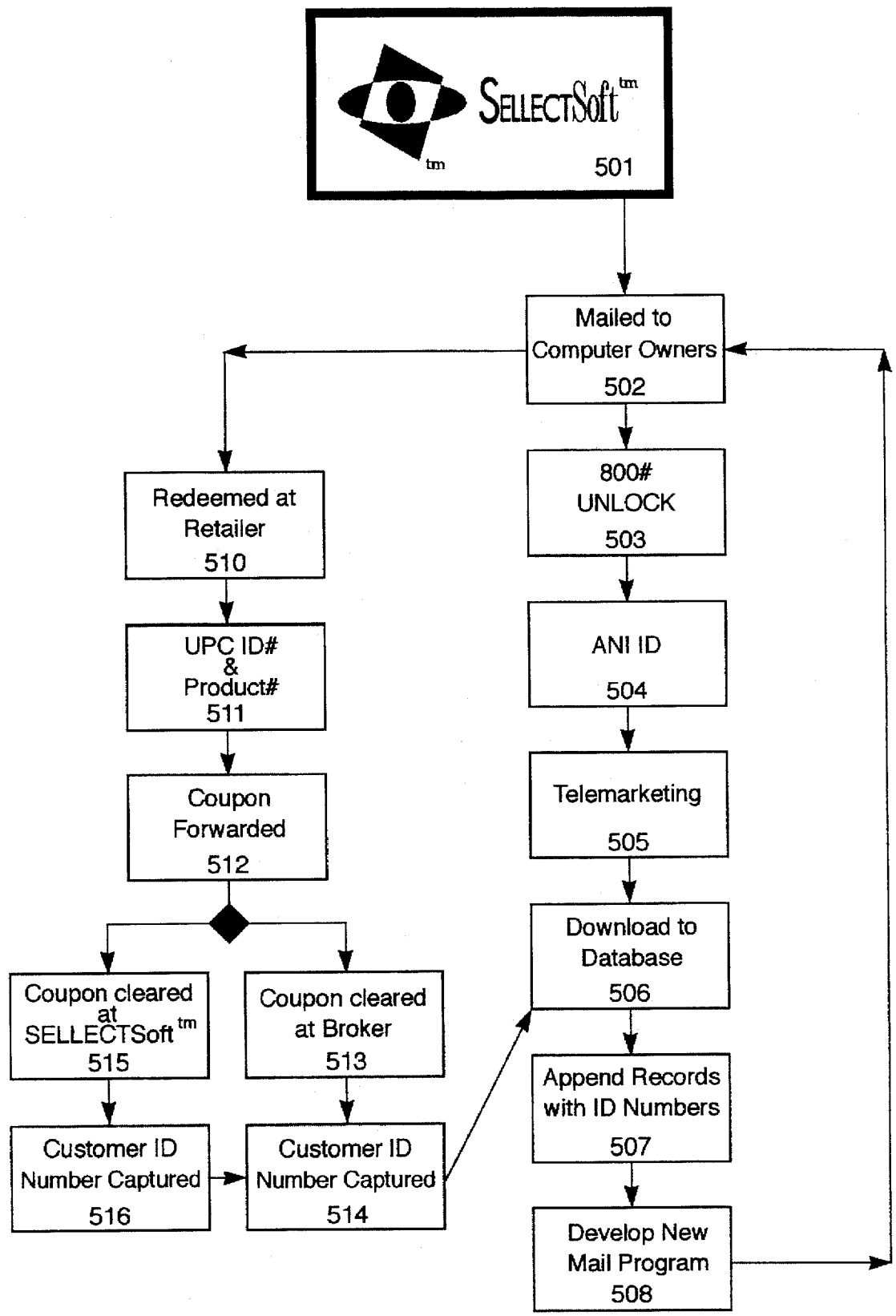
FIG. 5 is a block diagram illustrating the operation of the apparatus and method of the present invention.

Referring now to FIG. 5, an overview of the operation of the method and apparatus of the present invention is illustrated in the form of a flowchart. In step 501, a SELLECTSOFT™ diskette may be created containing coupon information and program data for displaying and generating coupons. SELLECTSOFT™ and SELLECTSoft™ are trademarks of SELLECTSoft, L.C. The SELLECTSOFT™ diskette may contain data for generating a number of coupons for different products. An initial diskette may contain a standard selection of coupons or may be tailored according to predetermined consumer demographic data or manufacturers specification.

In step 502, SELLECTSOFT™ diskettes are mailed to consumers, preferably computer owners. Computer ownership is readily obtainable demographic information available from warranty registrations, on-line service memberships, software purchases, magazine publishers or the like. A SELLECTSOFT™ diskette may even be preformatted in a prescribed format (e.g., MS-DOS™, Windows™, Macintosh™ or the like) corresponding to consumer demographic data. Moreover, consumer demographic data may be used to provide the SELLECTSOFT™ diskette with appropriate system and printer drivers for each consumer.

Figure 3:
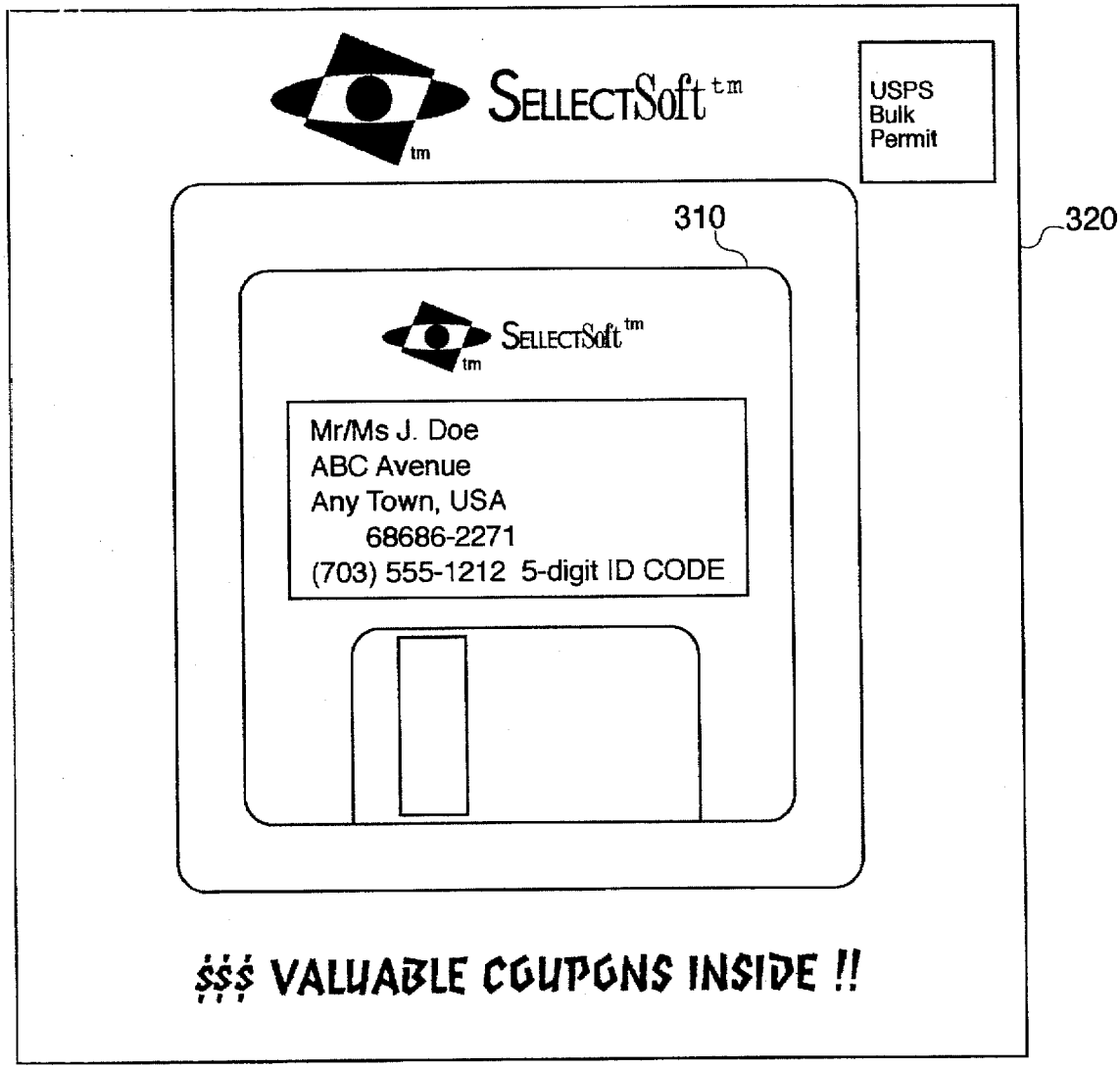
FIG. 3 is a front view of a diskette mailer illustrating the packaging of a SELLECTSOFT™ diskette.

SELLECTSOFT™ diskette 310 may be attractively packaged as illustrated in FIG. 3 in a bulk diskette mailer 320 so as to entice the consumer into opening the package and investigating the software contained therein. SELLECTSOFT™ diskette 310, attractively packaged, may pique consumer interest in a manner not possible with other types of coupon mass-mailing. A consumer may be more reluctant to throw away a computer diskette than a package of bulk-mailed coupons. Thus, a computer diskette may have a longer "table life" in the consumer home than a package of bulk mailed coupons. As a large number of coupons may be stored in one diskette, the frequency of such mailings may be significantly reduced. Thus, the overall cost of distributing SELLECTSOFT™ diskette 310 may be equal to or less than conventional bulk mailing techniques.

SELLECTSOFT™ diskette 310 may be provided with a date code such that the software within SELLECTSOFT™ diskette will become disabled once the date indicated by the date code has elapsed. Once the date has elapsed, the consumer may be prompted to call the 1-800 number to receive a new diskette or receive a new authorization number or download new coupon data. By providing a date code, the coupons generated by the SELLECTSOFT™ diskette may be provided with an effective expiration date in addition to expiration dates which may be printed on the face of the coupon.

In order to reduce material costs and environmental impact issues, SELLECTSOFT™ diskette 310 may be mailed with a return postage paid mailer for return of the diskette once all coupons have been printed or when a new diskette has been issued.

Moreover, the home computer owner demographic, although rapidly increasing, may be a desirable demographic for retailers to reach. Typically, home computer owners have higher education and income levels and may have larger amounts of disposable income. Moreover, the home computer user demographic, although changing rapidly, is heavily male. Paper coupons traditionally have a largest responding audience amongst females. Thus, SELLECTSOFT™ diskette 310 may more readily reach desirable consumer demographic groups missed by traditional paper couponing techniques.

In step 503, a consumer may load SELLECTSOFT™ diskette 310 into his or her computer either by running the SELLECTSOFT™ software from the B:\ drive, or by loading at least a portion of the SELLECTSOFT™ software into the hard drive of the consumer's computer. In Windows™ applications, an icon may be generated on the consumer's Windows™ screen. The consumer may click on such an icon to initiate operation of the SELLECTSOFT™ software. In order to prevent or reduce fraud, the portion of the SELLECTSOFT™ software stored on a consumer's hard drive may prompt the consumer to insert the SELLECTSOFT™ diskette 310 into the consumer's B:\ drive (or the like).

Figure 4:
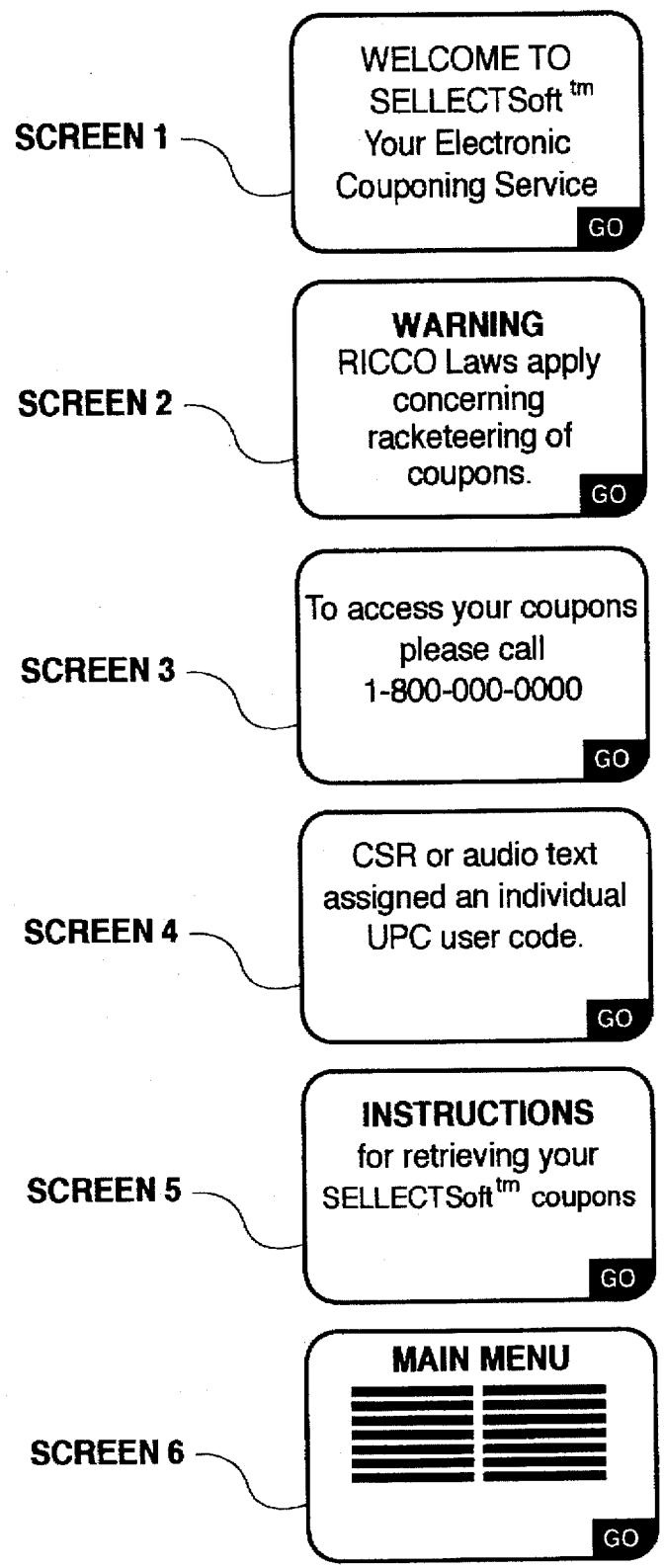
FIG. 4 illustrates a sequence of user screens in operation of the method and apparatus of the present invention.
Figure 10:
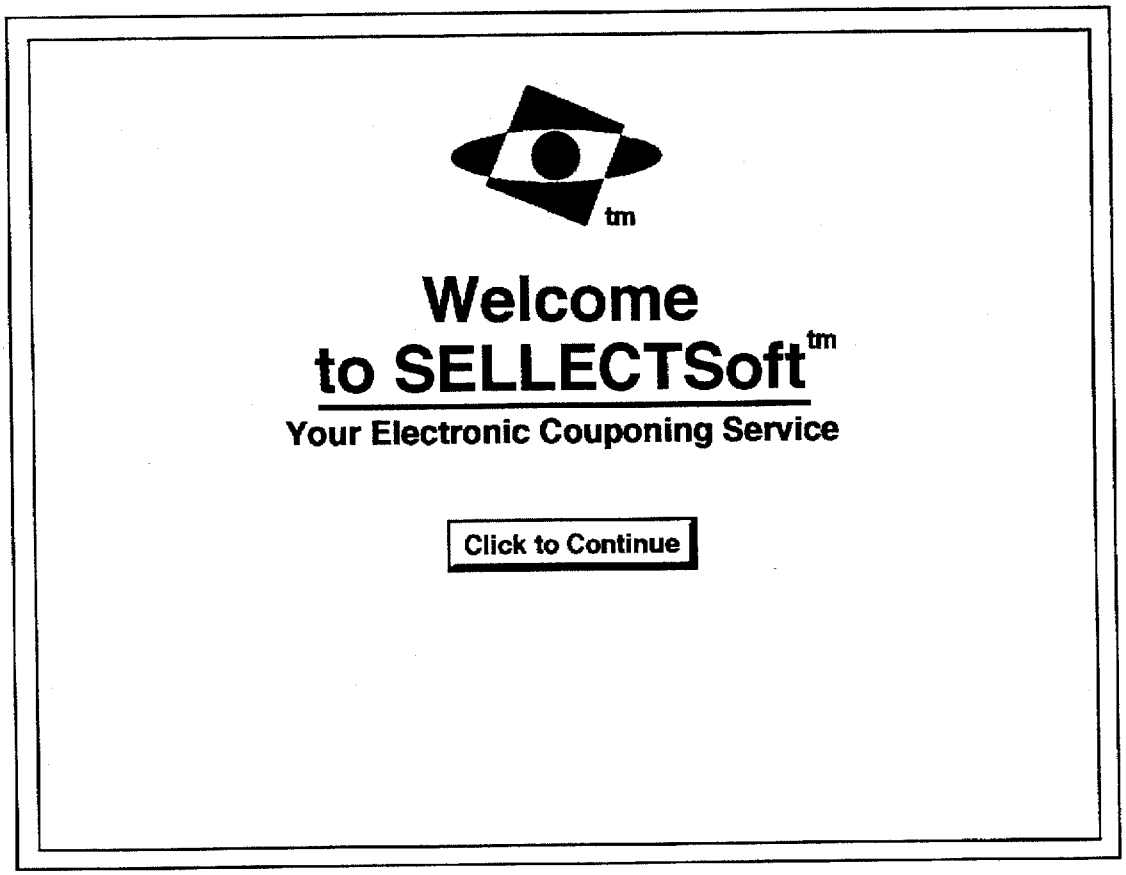
FIG. 10 illustrates a detail of screen 1 of FIG. 4.

Once the SELLECTSOFT™ software has been loaded into the consumer's computer, the consumer may then view a greeting screen, such as that shown in FIG. 10, or in screen 1 of FIG. 4. In addition, a warning screen, such as screen 2 of FIG. 4 may also be displayed. The consumer may next be prompted to call a 1-800 or audiotext number on the screen, as illustrated in screen 3 of FIG. 4, and in FIG. 11. Such toll free numbers may serve a number of purposes. First, if the consumer is having difficulty operating the software on SELLECTSOFT™ diskette 310 or if SELLECTSOFT™ diskette 310 is defective (e.g., exposed to high magnetic field during shipping) an operator may assist the consumer in resolving the problem or in shipping a new SELLECTSOFT™ diskette 310.

Second, the 1-800 or audiotext number may be used to obtain an authorization number to unlock the software in SELLECTSOFT™ diskette 310. This authorization number may be used to prevent unauthorized use of the SELLECTSOFT™ software by unintended targets (e.g., new occupant at consumer's old address) and provide a means for reducing fraud as will be discussed in more detail below. Third, in connection with the authorization number, the 1-800 number may be used as a means of collecting additional demographic data, such as age, income, or the like.

To prevent unauthorized use of SELLECTSOFT™ diskette 310, various means may be employed to verify that a targeted consumer is indeed the caller on the 1-800 number.

In step 504, Automatic Number Identification (ANI) sometimes referred to as "Caller-ID"™ may be utilized to confirm that the caller is indeed calling from the target consumer's residence. Correct residence phone number information may be provided from a consumer database or may be entered at this point for future use. If a consumer is not calling from his home phone (e.g., office, cell phone or the like) a 1-800 operator may then query the consumer for this discrepancy.

In step 505, the 1-800 operator may obtain marketing information from the consumer and store such information in the consumer database. Marketing information may include age, marital status, income level, children present, or the like. In addition, the operator may verify that the name spelling and address are correct. Once the consumer has provided this information to the 1-800 operator, a validation number may be given to the consumer to enable/unlock the software in SELLECTSOFT™ diskette 310.

The validation number may then be entered by the consumer into his computer, when prompted by the SELLECTSOFT™ software. The process by which the SELLECTSOFT™ software is unlocked uses an algorithm which takes into account numerous pieces of information including the consumer's name, serial number of SELLECTSOFT™ diskette 310, and date of activation. One advantage of this approach to authorizing the software is that replication of the software is simplified, as each diskette within a campaign may be identical.

Copy protection techniques may be used to prevent further copying of SELLECTSOFT™ diskette 310. For example, a known bad sector may be placed on the diskette to prevent duplication of the diskette using DOS utilities. However, prevention of duplication may not be a long term concern, as the real-time authorization system for authorizing the SELLECTSOFT™ software may severely reduce or eliminate fraud from coupon duplication. In addition, each coupon generated may be imprinted with the consumer's ID number (as a barcode) and/or name and address (in text or barcode) to discourage duplication.

As an alternative to, or in conjunction with a live 1-800 operator, an audio text system (e.g., voice mail menu or the like) may be provided for retrieving marketing data and dispensing validation numbers. Upon calling the 1-800 number, the consumer may be prompted through a series of voice menus. The consumer may enter information using the touch-tone™ keypad on a telephone.

Alternately, or in addition to the techniques discussed above, SELLECTSOFT™ diskette 310 may be provided with modem communications software to upload marketing information via modem (if the consumer is so equipped) and download validation information. Such a technique may operate in a manner similar to warranty registration software typically packaged with computer and software. The consumer may enter marketing information in an applications screen in Windows™ via keyboard on his or her compute. Once entered, such data may then be stored and uploaded via modem to the SELLECTSOFT™ database. Once such demographic and identification information is received, a validation number may then be downloaded to the consumer's computer via the same modem connection.

Once marketing information is received, it may be downloaded to the consumer database as illustrated in step 506. The consumer database may contain names of consumers selected to receive SELLECTSOFT™ diskette 310, as well as demographic data for each consumer. In step 507, a unique ID number may then be appended to the database corresponding to each consumer receiving a validation number. The ID number may be the validation number, or a unique combination of the validation number encoded with other data, or may be a separate number entirely. The ID number may also be stored in SELLECTSOFT™ diskette 310 and may be use to track fraud, as will be discussed below.

Figure 11:
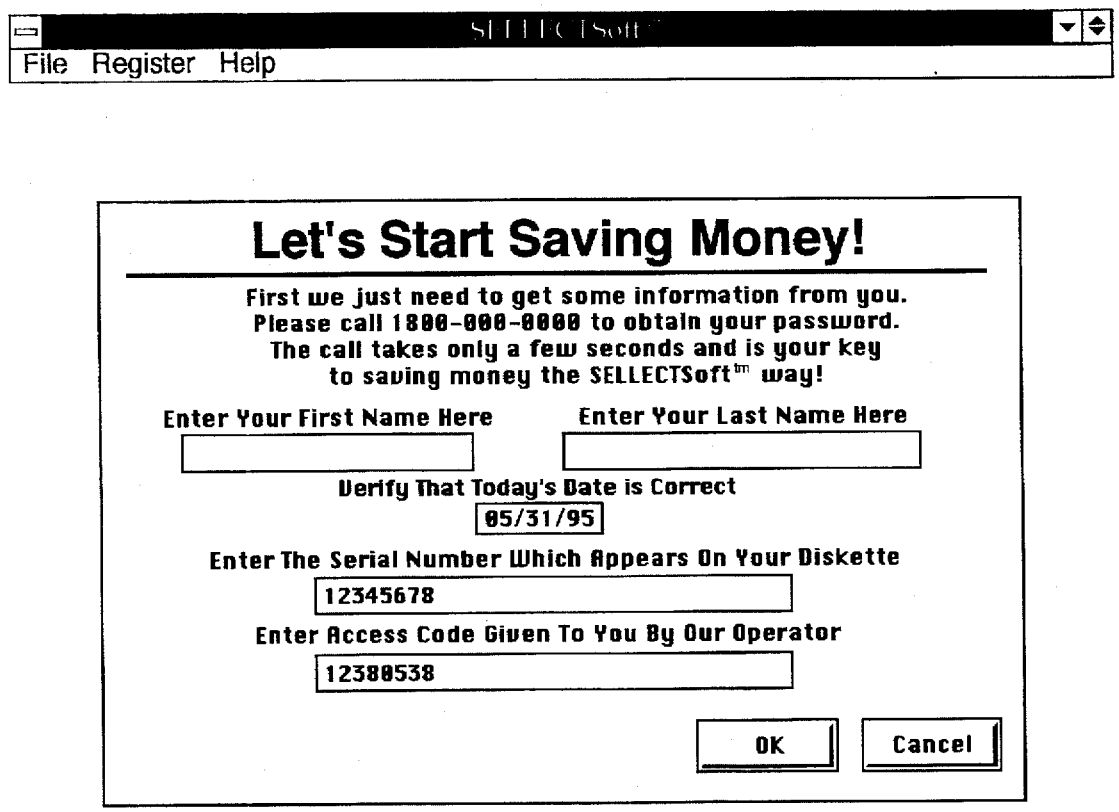
FIG. 11 illustrates a detail of screen 3 of FIG. 4.

Once the consumer has received a validation number, he may operate the software contained in SELLECTSOFT™ diskette 310. The operation of the software within SELLECTSOFT™ diskette 310 is illustrated in FIG. 4 and FIGS. 10–14. In FIG. 10 and screens 1 and 2 of FIG. 4, the consumer may view greeting and warning messages. In FIG. 11 and screen 3 of FIG. 4, the consumer may be prompted to call the 1-800 number as discussed above in connection with FIG. 5. In FIG. 11 and screen 4 of FIG. 4, the consumer may then be prompted to enter his validation code as received from the 1-800 number.

The validation code may prevent unauthorized use of SELLECTSOFT™ software. Each validation number may be unique to the serial number of each SELLECTSOFT™ diskette 310. Thus, a consumer may not be able to validate his or her SELLECTSOFT™ diskette 310 using a neighbor's validation number. The validation number also insures that accurate marketing information is received from the consumer before coupons are issued in order to insure that demographic data generated by the SELLECTSOFT™ system has a high degree of accuracy as compare to prior art systems. In addition, the use of the validation number reduces the number of consumers necessary to track with the system and assists in mailing list maintenance and hygiene. Consumers who do not obtain validation numbers after a predetermined period may be contacted by telemarketing personnel to inquire as to why the SELLECTSOFT™ software was not utilized, and/or to assist in persuading the consumer to utilize the SELLECTSOFT™ system.

Once a valid validation code has been entered, an instruction screen may be displayed as illustrated in screen 5 of FIG. 4. instruction screen 5 may include a tutorial on how to use SELLECTSOFT™ as well as a demonstration of SELLECTSOFT™ software.

Figure 12:
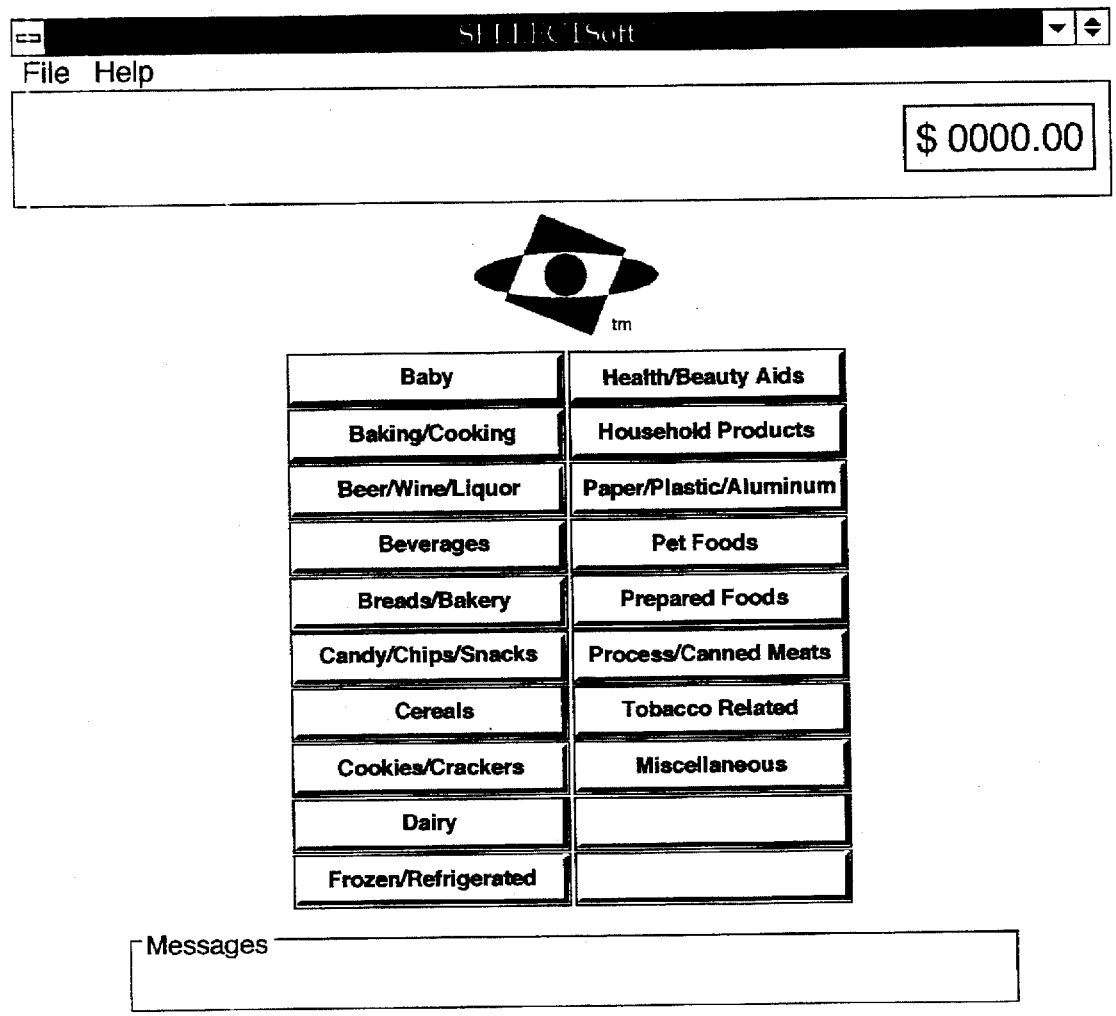
FIG. 12 illustrates a detail of screen 6 of FIG. 4.
Figure 13:
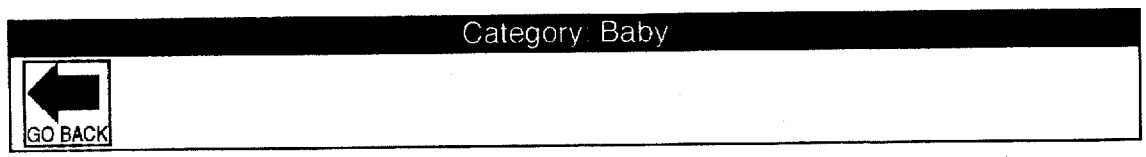
FIG. 13 illustrates a detail of a screen for selecting further subcategories of products from the screen of FIG. 12.

From instruction screen 5, the user may proceed to main menu screen 6. FIGS. 12–13 illustrate the further operation of the menu system. A consumer may click on a general category, and then click on more specific categories within that general category. It should be noted that in the preferred embodiment, the SELLECTSOFT™ software is designed to work in a Windows™ 3.0x graphical user interface (GUI) environment or Windows™NT™ GUI environment. Thus, the screens illustrated in FIG. 4 may not necessarily be displayed in the order shown. When a validation number has been previously entered, a user may proceed directly to instruction screen 5 or main menu screen 6 once the SELLECTSOFT™ software has been loaded.

Figure 6:
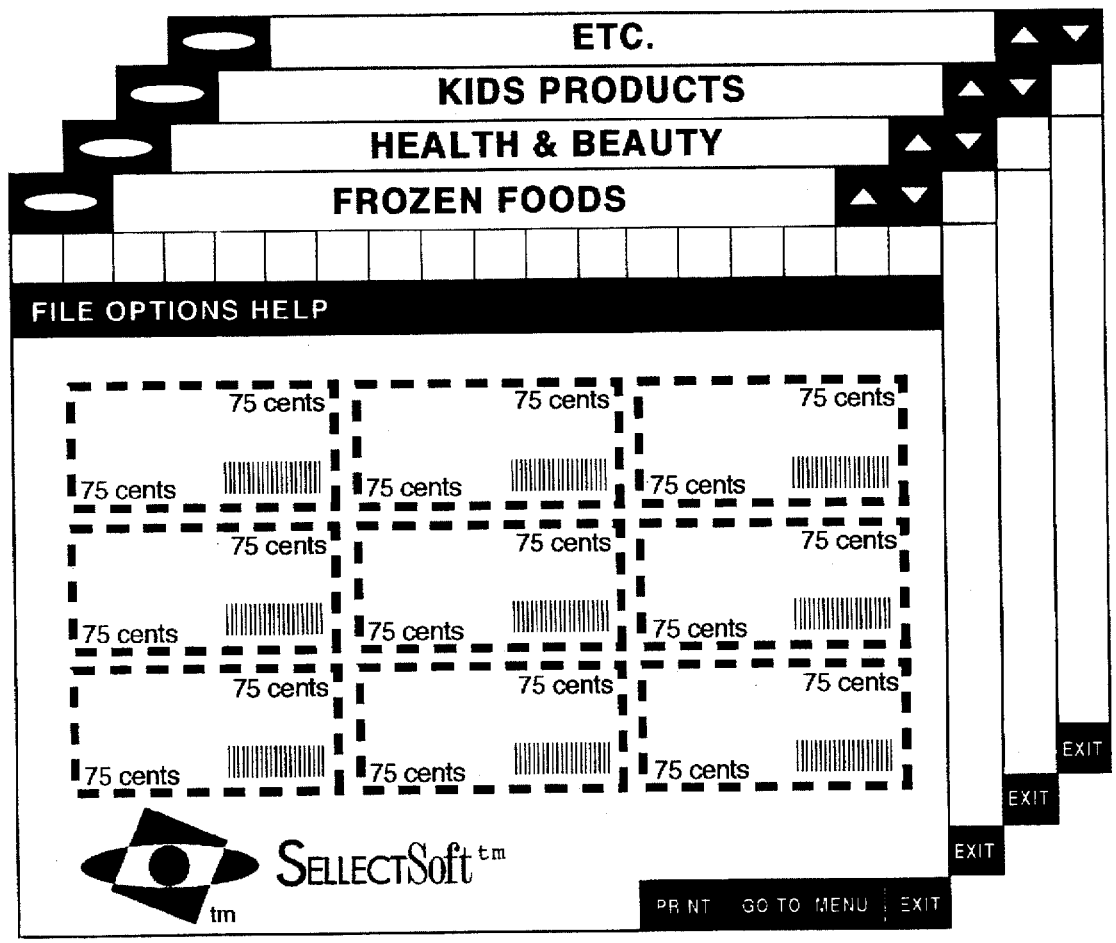
FIG. 6 is an illustration of a user display in the method and apparatus of the present invention.

From main menu screen 6, a user may select one of a number of categories of products to review. Each product may be grouped according to a category and may appear in more than one category. Example of categories may include, for example, supermarket department classifications (e.g., frozen foods, produce, meats, deli, or the like) or other types of categories of products (e.g., electronics, fast foods, or the like). The consumer may select a category by clicking on a category icon or selecting a category icon from a pull-down menu in a manner known in the art. Each category, as illustrated in FIG. 6, may comprise one or more screens containing graphical representations of coupons. A user may browse through screens of coupons within a category, or through various screens in various categories, as illustrated in FIGS. 12 and 13. In addition, a simple text search engine may be provided to enable the consumer to quickly find coupons of interest. A consumer may enter a word or portion of a word defining a brand name, category, or generic product name. The SELLECTSOFT™ software may then display a coupon or coupons most closely related to the entered data.

Figure 14:
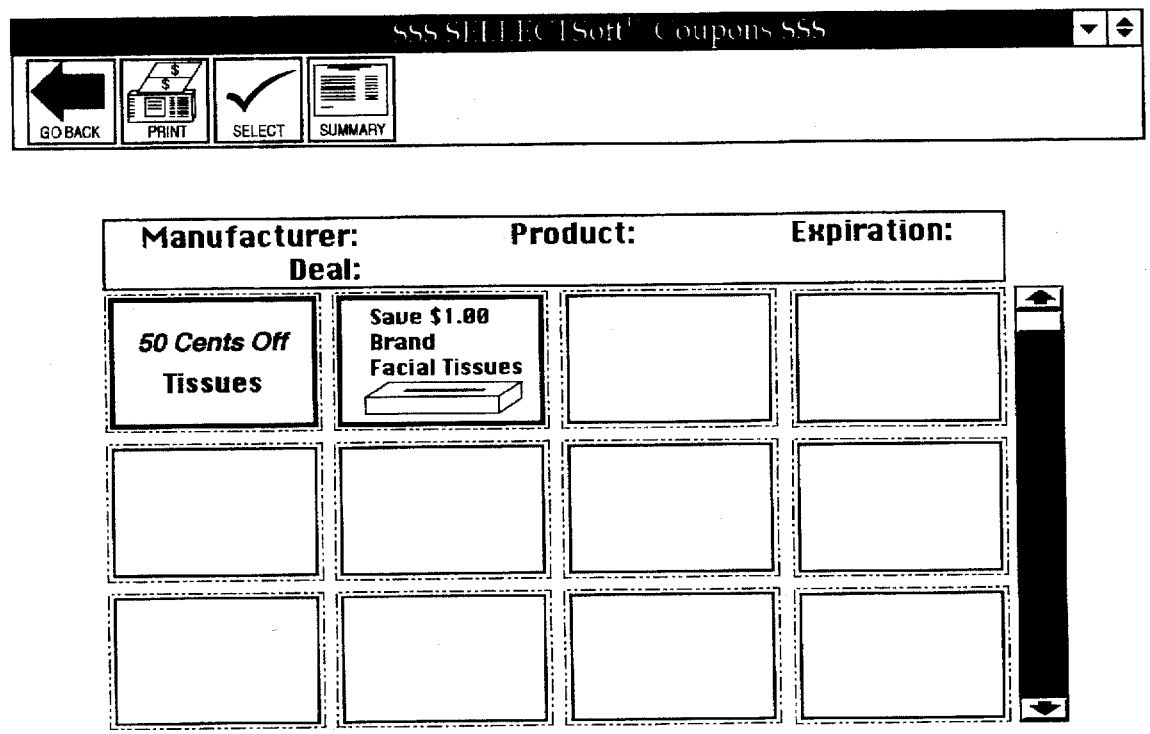
FIG. 14 illustrates a further detail of the screen of FIG. 6.

From a display coupon menu, such as illustrated in FIGS. 6 and 14, a consumer may select a coupon for printing by clicking on the coupon or selecting the coupon using a pull-down menu or the like. The consumer may then print that coupon by clicking on a print icon or selecting a print option from a pull-down menu.

Figure 7:
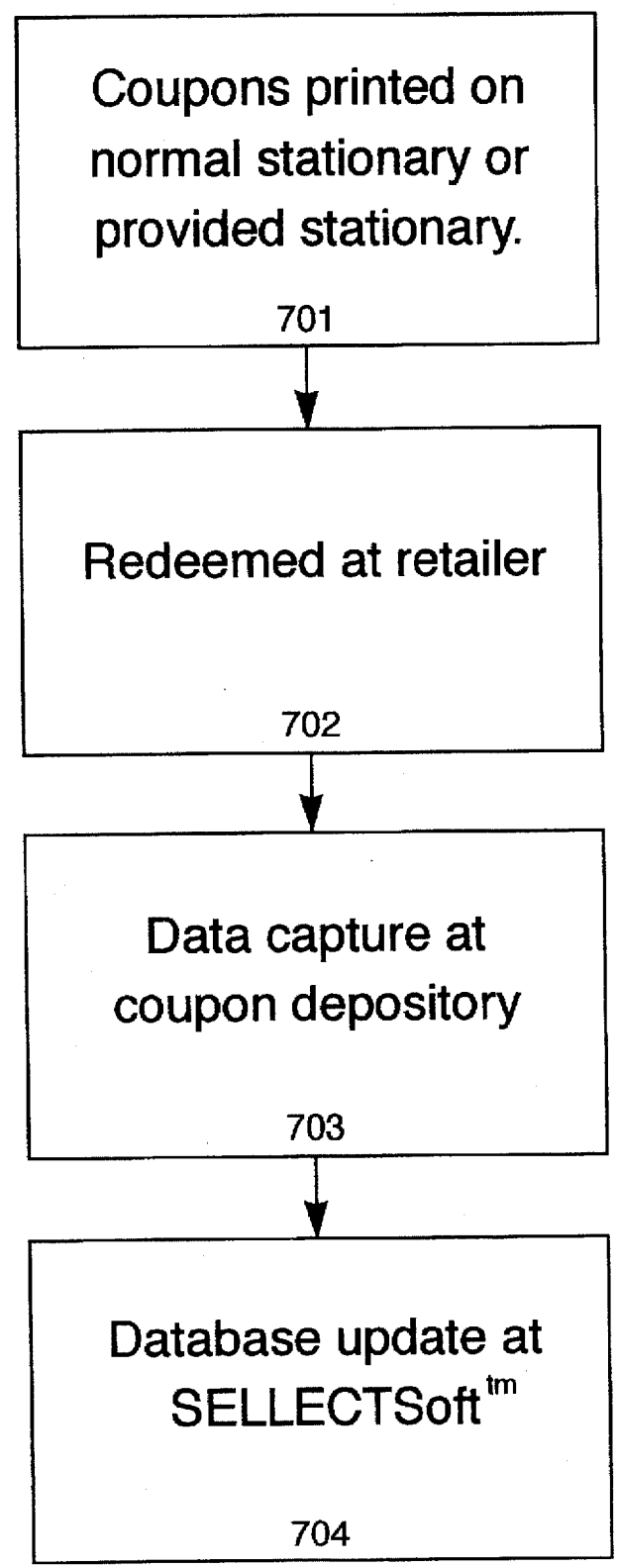
FIG. 7 is a block diagram illustrating the operation of the coupon printing operation of the present invention.

FIG. 7 illustrates the steps in printing a selected coupon. It should be noted that prior to installation of the SELLECTSOFT™ software, a suitable printer driver may be installed in the consumer's PC, either as a part of the SELLECTSOFT™ software, or as part of the Windows™ GUI. In the preferred embodiment, the SELLECTSOFT™ software may use the selected default printer driver in the Windows™ GUI as a printer driver.

Once the print command has been selected, as indicated in FIG. 7, coupons may be printed on a consumer's printer. Suitable prompts may be used to insure that the consumer has indeed selected the correct coupon for printing and desires printing. In step 701, coupons may be printed on plain paper provided by the consumer, or may be printed on special paper provided with SELLECTSOFT™ diskette 310.

Individual coupons may be stored on SELLECTSOFT™ diskette 310 as bit map data, suitably compressed for storage using compression techniques known in the art such as the LZEXPAND.DLL utilities shipped with Windows™ 3.0 or 3.1. Alternatively, coupon image data may be stored as a series of bit-mapped components which may combined to generate a coupon image for display or printing. For example, common border and coupon redemption information need only be stored once. Product logo and other information may be stored as individual bit maps. Discount or rebate information (e.g., cents off) may be generated from numerical data using font bit maps. Bar code images may also be suitably generated in a similar manner.

A consumer may select, using a mouse or the like, individual coupons to be printed on a home computer printer. As each coupon is selected, a savings counter, as illustrated in FIG. 12, may display total savings from individually selected coupons during a particular session. Thus, the consumer can readily appreciate the overall savings provided through SELLECTSOFT™.

Each coupon may be printed in a graphics mode of a laser type printer (e.g., Hewlett-Packard™ laser jet series) Ink jet printer (e.g., Canon™ Bubblejet™ series) or high resolution dot matrix printer (e.g., 24 pin dot matrix printer) for example at 300×300 dots per inch (dpi) resolution. Lower resolutions may be used so long as the coupon is legible and readable bar codes may be generated on the coupon. For example, a useable coupon may be even be generated on a nine pin dot matrix printer.

The coupon may be provided with printed indicia indicating product and discount or rebate, as well as traditional coupon redemption terms (expiration date or the like). The bar codes provided on the coupon may comprise a first group of bar codes identifying product, size, and redemption terms (e.g., cents off, two-for-one, or the like). This first group of bar codes may be those already in use in prior art coupons. Thus, the coupons generated by the SELLECTSOFT™ software may be read by existing supermarket or retail store scanning or coupon redemption devices without modification to those devices.

A second group of bar codes may be provided with the consumer ID number. This second group of bar codes may be provided adjacent to or embedded in the first group of bar codes, or may be provided in a separate portion of the coupon to prevent confusion in scanning. Such a group of bar codes may be provided, for example, in a set of bar codes representing unique household ID number, to be added to most manufacturers coupons by 1997 in a format known as EAN-128 designated by the uniform code council (UCC).

However, unlike other systems which may provide preprinted consumer ID bar codes on coupons, the system of the present invention dynamically and interactively assigns a consumer ID bar code only after the consumer has initiated the 1-800 or audiotext call. Thus, data generated by the SELLECTSOFT™ system regarding consumer spending and the like has a much higher degree of accuracy that in prior art systems.

In step 702, the consumer may redeem the printed coupon (s) at a retailer in the same manner as prior art printed coupons. The retailer may scan these coupons using traditional scanning equipment, to determine the correct discount or rebate to apply to the product. Alternately, if the retailer is not provided with scanning equipment, the coupon may be redeemed using manual redemption techniques (e.g., reading printed indicia on the coupon to determine discount or rebate for the indicated product).

It should be noted that the SELLECTSOFT™ software may allow for only a limited number of printings of a particular coupon. As discussed above, coupons may generally be used only for promotional purposes to introduce consumers to new products or to induce future sales of a product. A product manufacturer may not want to have large portions of sales occur at coupon prices, however. Thus, after a predetermined number of printings, an individual coupon selection may disappear from the SELLECTSOFT™ software menu, or printing of such coupons may be blocked.

Once redeemed at the retailer, paper coupons are traditionally sorted, counted, and returned to a coupon depository for further redemption and processing. In step 703, at the coupon depository, such coupons may be further scanned to capture product information data and consumer ID data from the first and second bar code portions. From this data, it may be determined exactly which consumers purchased which particular products and from which retailers. Such data may have a high degree of accuracy as compared to previous tracking techniques.

From this marketing data, the consumer database may be updated as illustrated in step 704. The consumer database may contain specific information as to quantities and selections of products purchased by a consumer, as well as more general information as to types of products purchased. From this information, a new SELLECTSOFT™ diskette 310 may be prepared for each selected consumer, tailored to the demographics and demonstrated buying habits of the consumer.

For example, if an initial SELLECTSOFT™ diskette 310 mailed to a consumer contains various pet product coupons (e.g., dog food, cat food, or the like), and several of these are subsequently redeemed, it may be inferred that the consumer is a pet owner. In future mailings, additional pet product coupons may be included, or alternatively, such coupons may be more narrowly targeted (e.g., to dog products only or cat products only) depending upon the buying preferences of the consumer.

If the consumer redeems no coupons from a given category, such coupons may be de-emphasized until the consumer's buying habits change. For example, if a given consumer uses no baby or child product coupons, such categories may be de-emphasized. If a consumer starts redeeming such coupons, then it may be inferred that the consumer has started a family, and coupons targeted toward family needs may then be included in a consumer's subsequent mailings.

Other techniques for distributing coupons and retrieving data may be utilized within the spirit and scope of the present invention. For example, on-line services or the like may be utilized to download or upload data. A user may receive an initial SELLECTSOFT™ diskette 310 in the mail or download an initial package of program data from an on-line service or through 1-800 modem dialup or through CD-ROM or the like. Subsequent "packages" of coupons may then be downloaded to a consumer's computer through on-line services or 1-800 modem dialup. Coupon printing information may be uploaded via such on-line services to provide marketing data, however, it is believed that such printing data may not be as accurate as redemption data, as redemption data indicates a definite sale of a product.

The use of the consumer ID number on the coupon may be used to reduce or track fraud. If a consumer copies printed coupons (e.g., through photocopying or the like) the consumer ID number may be copied with the coupon. Once redeemed, the number of coupons for each consumer may be readily counted at a coupon clearinghouse. If a consumer redeems more than his allotted share of coupons, suitable warnings may be made to the consumer to stifle such future fraud. Moreover, suitable warnings, such as on screen 2 of FIG. 4 as well as the printing of the consumer's name on each coupon may deter most consumers from attempting such fraud. Each consumer ID number acts as a "fingerprint" to indicate the source of the coupon. Thus, while the consumer ID number and printed name may not prevent fraud outright, it makes such fraud much easier to detect, and thus discourages such fraud.

For example, one digit of the consumer ID number or other number encoded on the coupon may act as a counter to count the number of time a specific coupon has been printed. A manufacturer may desire to allow a consumer to print a predetermined number of a particular coupon (e.g., 3) to allow for limited redemption while providing an allowance for printer jams or the like. Each successive printing of an individual coupon may decrement the counter. Once redeemed, the SELLECTSOFT™ software may readily determine how may of a particular coupon had been redeemed by a consumer.

Referring back to FIG. 5, a second portion of the SELLECTSOFT™ process will now be described. As illustrated in FIGS. 4, 6, and 7, a consumer may print out selected coupons once a validation number has been received. Printed coupons may be redeemed at a retailer, as illustrated in step 510 and discussed in step 702 in FIG. 7. The retailer may redeem the coupon using traditional scanning equipment to retrieve universal product code (UPC) and product numbers, as illustrated in step 511. Alternately, the coupon may be manually redeemed. In step 512, the coupon may be forwarded for processing.

In addition to bar-coding of consumer ID number, the consumer's name may be printed on each coupon to discourage coupon fraud. A consumer may be less likely to copy or generate additional coupons with his or her name appearing on them.

Coupon processing may occur at a traditional coupon brokerage house as illustrated in step 513. Such coupon brokerage houses receive coupon and redemption data from retailers and package such data for manufacturers such that retailers may be reimbursed for coupon redemptions. At the coupon brokerage, the unique consumer ID number printed on the coupon in bar code may be captured and uploaded to the SELLECTSOFT™ database as illustrated in step 514.

Alternately, coupon processing may occur at a specialized SELLECTSOFT™ coupon brokerage house as illustrated in step 515. The SELLECTSOFT™ coupon brokerage houses may receive SELLECTSOFT™ coupon and redemption data from retailers and package such data for manufacturers such that retailers may be reimbursed for coupon redemptions. At the SELLECTSOFT™ coupon brokerage, the unique consumer ID number printed on the coupon in bar code may be captured and uploaded to the SELLECTSOFT™ database as illustrated in step 516.

Either way, the consumer ID information may be utilized to update the SELLECTSOFT™ database as illustrated in step 506. Once SELLECTSOFT™ database records are updated with ID number information, a new SELLECTSOFT™ mailing program may be developed using the demographic and purchasing information generated from a previous mailing of SELLECTSOFT™ diskette 310. Subsequent mailings may be mailed on a weekly, monthly or quarterly basis, depending upon consumer use of SELLECTSOFT™ coupons and other marketing factors.

Figure 1:
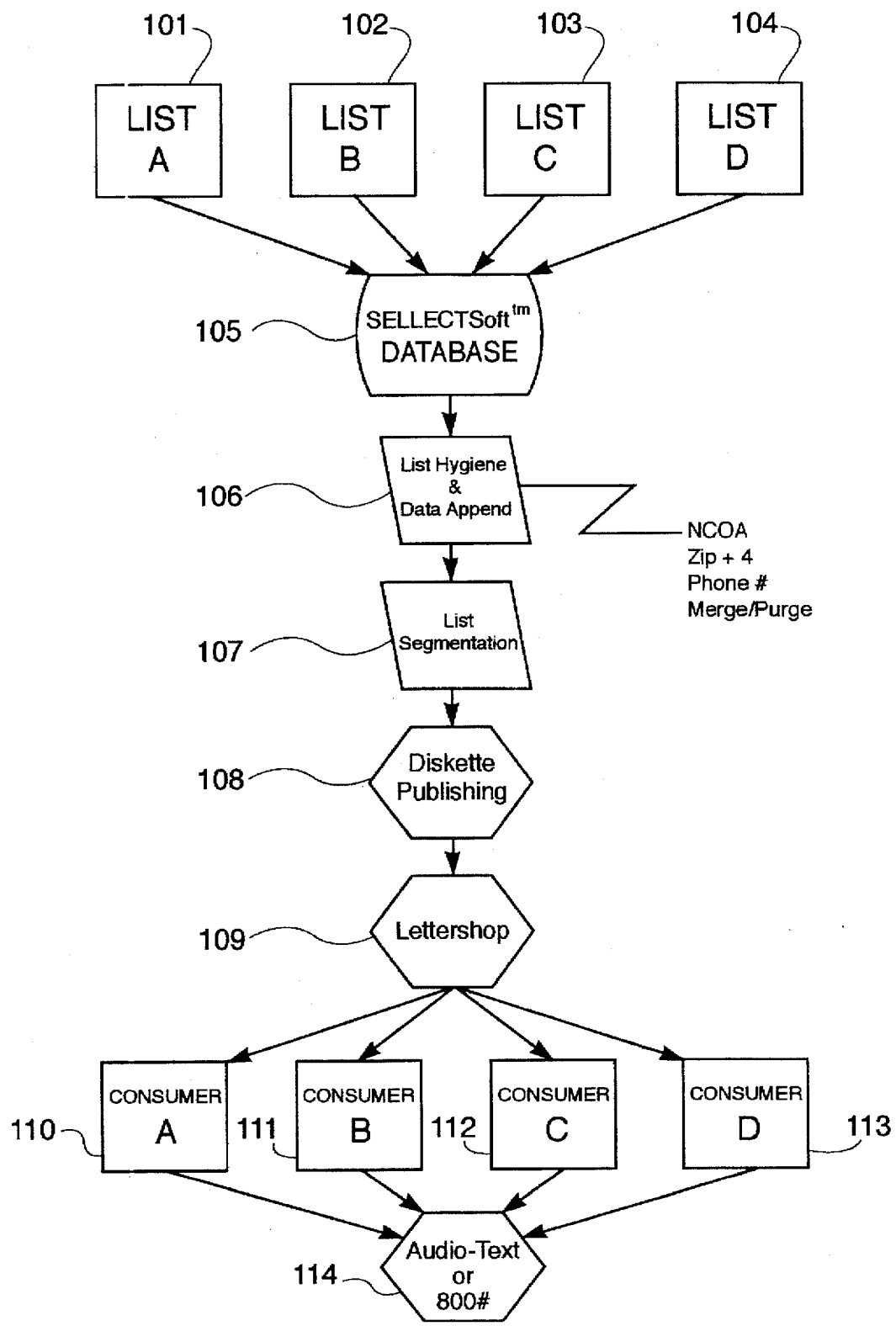
FIG. 1 is a first portion of a flow chart illustrating the operation of the apparatus and method of the present invention.
Figure 2:
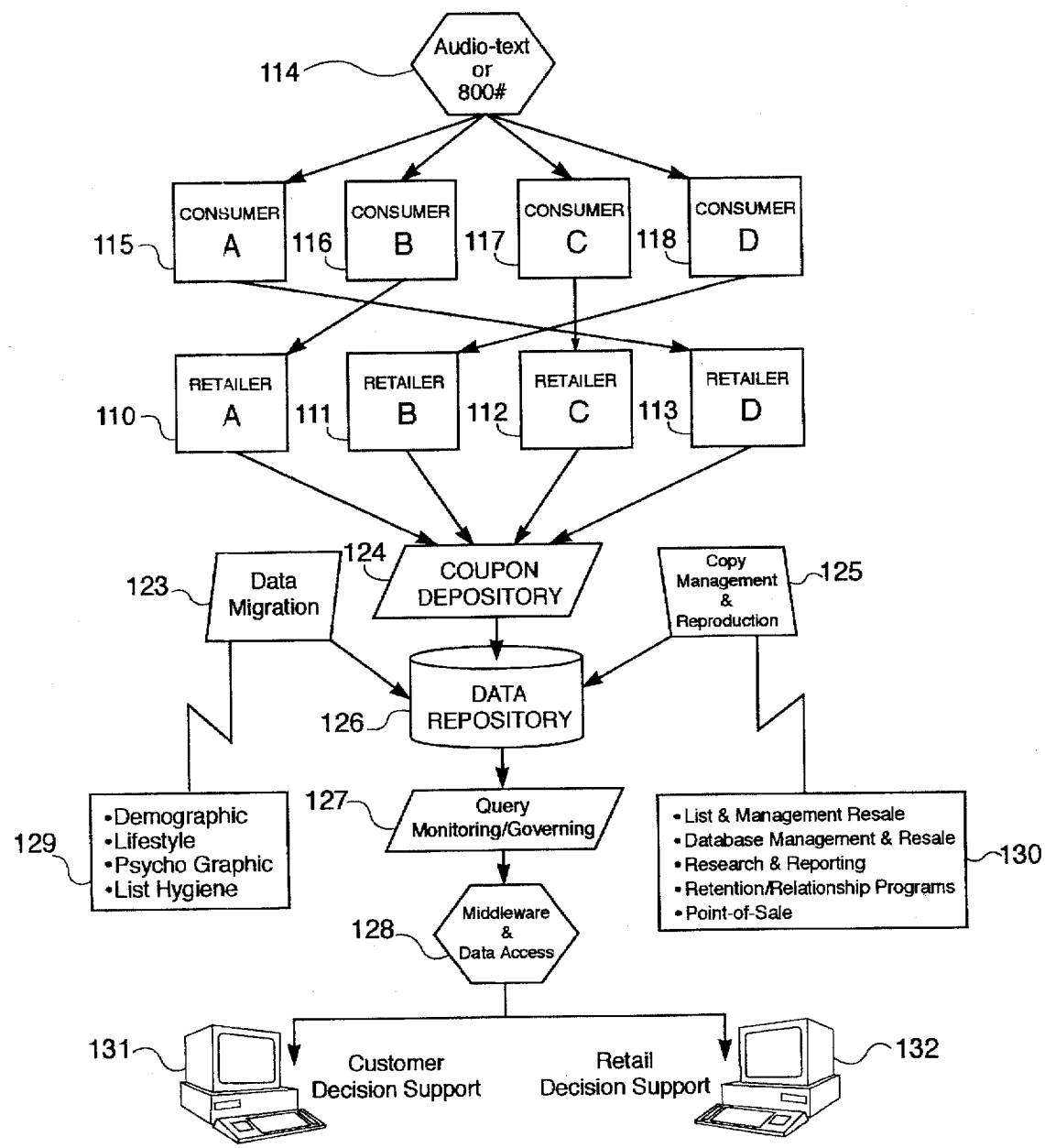
FIG. 2 is a second portion of a flowchart illustrating the operation of the apparatus and method of the present invention.

From the understanding of the invention described above in connection with FIGS. 3, 4, 5, 6, and 7, a more detailed description of the invention will now be provided in connection with the flowchart of FIGS. 1 and 2. FIGS. 1 and 2 are a combined flowchart illustrating the SELLECTSOFT™ couponing technique in more detail. In addition, the flowchart of FIGS. 1 and 2 further illustrate how marketing data may be generated and exploited using the SELLECTSOFT™ couponing techniques. FIG. 1 is a flowchart illustrating a first portion of the steps in the SELLECTSOFT™ electronic coupon distribution system.

As illustrated in FIG. 1, consumer mailing LIST A 101, LIST B 102, LIST C 103, and LIST D 104 may be combined to form an initial SELLECTSOFT™ database 105. Any number of lists may be combined to form SELLECTSOFT™ database 105, and in addition, additional list information may be later added to SELLECTSOFT™ database 105 as time progresses. Examples of suitable mailing and/or consumer lists 101–104 may comprise, for example, list identifying consumers with household computers. Lists 101–104 may originate from multiple sources (e.g., computer magazine subscription lists, commercial mailing list services, or the like) typically used for database development, direct mail, and telemarketing or the like.

Combined, these lists may be used to append and/or form SELLECTSOFT™ database 105. In addition to consumer name and address information, SELLECTSOFT™ database 105 may be revised, as will be further discussed below, to include additional information about each consumer. Examples of such additional information include activation/validation information and demographic information retrieved during the 1-800 validation discussed above. Moreover, individual coupon redemption information may also be added to SELLECTSOFT™ database 105.

A risk/fraud score may be added to SELLECTSOFT™ database 105 from information gathered during the activation call. This score may be based upon a number of criteria, for example, whether a consumer's ANI matches the number in the database for that consumer or whether a consumer's address, name or other basic information match the information in the SELLECTSOFT™ database. Corresponding risk/fraud scores may be assigned to each consumer based upon such criteria. Depending upon a consumer's risk/fraud score, a validation number may or may not be given to a consumer. If the risk/fraud score is high, a validation number may be denied and a new SELLECTSOFT™ diskette 310 mailed to the consumer. Thus, for example, the use of false names or addresses or the like may be eliminated or reduced.

In addition, consumers with high risk/fraud scores (as well as a random sampling of other consumers) may be later selectively monitored for coupon fraud. Thus, the need to monitor all consumers within SELLECTSOFT™ database may be eliminated or reduced.

In step 106, SELLECTSOFT™ database 105 may be further passed though a list hygiene/data append step. In step 106, the combined lists 101–104 may be cross checked to reduce or eliminate redundant entries. For example, variations of the same consumer name may be combined into one entry. Thus, for example, a consumer name entered several times as "R. BELL", "R. P. BELL", "ROBERT BELL", or "BOB BELL" may be combined into one data entry such that the consumer does not receive multiple SELLECTSOFT™ diskettes.

In addition, a cross-reference to the database phone number and/or address may be used to determine if a prior diskette was sent the same address. Thus, for example, multiple consumers at the same household having slightly different addresses may not receive multiple copies of SELLECTSOFT™.

In addition, in step 106, Zip+4 postal codes may be added to addresses to further speed processing of mailings and/or qualify for reduced postal rates. Moreover, the postal service NCOA (national change of address) file may be cross-referenced with data in SELLECTSOFT™ database 105 to provide new consumer addresses or to eliminate redundant mailings to the same consumer at multiple addresses.

In step 107, SELLECTSOFT™ database 105 may be segmented into various lists based upon consumer buying habits (from demographic information) regionality, and/or other product manufacturers specifications. For example, for a regional mailing of SELLECTSOFT™ diskette 310, it may be desirable to segment SELLECTSOFT™ database 105 into a list for a particular region (e.g., mid-atlantic region, metropolitan Washington D.C. region). Such segmentation may be made on a zip code, state or other basis. Using zip codes it may be possible to segment a list to a particular individual neighborhood.

Moreover, other demographic information may be used to segment SELLECTSOFT™ database 105, such as annual income, or computer type. For example, in an initial release, SELLECTSOFT™ software may be limited to a Windows™ GUI environment. Thus, it may be desirable to segment SELLECTSOFT™ database, at least initially, to target Windows™ users. Other segmented lists may be then prepared to target users of other operating systems (e.g., MS-DOS™, Macintosh™, or the like) to provide such users with appropriately formatted SELLECTSOFT™ software.

Once a target list has been generated, SELLECTSOFT™ diskettes 310 may be published as illustrated in step 108. Manufacturer coupons may then be entered into a SELLECTSOFT™ master mailer diskette utilizing a proprietary build process. Each SELLECTSOFT™ diskette 310 mailed on a given mailing campaign may contain identical coupon information, thus simplifying diskette reproduction. List segmentation may be utilized to group consumers into mailing campaign groups such that diskettes tailored toward particular consumer demographic profiles may be produced in one batch.

A label affixed to each SELLECTSOFT™ diskette 310 may denote a unique SELLECTSOFT™ serial number for that diskette, along with address, phone number, and consumer name, as indicated in FIG. 3. The serial number of the diskette may be later used by the consumer in the validation process as discussed below.

In step 109, SELLECTSOFT™ diskettes 310 may then be inserted into mailers and mass mailed to consumers A, B, C, & D (110, 111, 112, and 113). For the purposes of illustration, four consumers A,B,C, & D (110, 111, 112, and 113) are shown. However, it may be appreciated that the number of consumers in a given mailing will be considerably larger.

In step 114, consumers A, B, C, & D (110, 111, 112, and 113) may call an audio-text or 1-800 number (or modem connection) to provide further demographic data, confirm name and address, and receive validation information, in the manner discussed above in connection with FIG. 5. Note that although FIG. 1 illustrates each consumer A, B, C, & D (110, 111, 112, and 113) receiving validation via the 1-800 number, it is presumed that for a given campaign, a certain percentage of consumers may fail to respond. For example, some targeted consumers may not have a computer, despite demographic data to the contrary. Alternately, a consumer may not be interested in SELLECTSOFT™ or SELLECTSOFT™ diskette 310 may have been lost or misdirected in the mail.

For those consumers who fail to respond to a mailing, follow-up telemarketing calls may be made to determine why the consumer failed to respond. The SELLECTSOFT™ database may then be adjusted to either eliminate that consumer name, or modify future mailings in response to consumer comments, data, and the like. Note that as opposed to prior art paper couponing techniques, the SELLECTSOFT™ system allows for more careful tracking of which consumers open the coupon mailing, which consumers redeem coupons, and which consumers take no interest whatsoever. In contrast, conventional paper couponing techniques may only provide information as to what percentage of coupons from a given campaign have been redeemed.

FIG. 2 is a flowchart illustrating a further portion of the steps in the SELLECTSOFT™ electronic coupon distribution system. Again, as with FIG. 1, this portion of the detail flowchart illustrates the steps shown in FIG. 5 in more detail.

As illustrated in FIG. 2, from step 114, each consumer A, B, C, & D (110, 111, 112, and 113) may then receive an authorization or validation number after providing demographic and proof of identification information. Each consumer A, B, C, & D (110, 111, 112, and 113) may then print out selected coupons as discussed above in connection with FIG. 7 and take such coupons to retailer A, B, C, or D (119, 120, 121, or 122). As illustrated in FIG. 2, each consumer A, B, C, & D (110, 111, 112, and 113) make take printed coupons to any of retailers A, B, C, or D (119, 120, 121, or 122) or multiple retailers. For the purposes of illustration, only four retailers A, B, C, or D (119, 120, 121, or 122) are illustrated here. However, it can be appreciated that the number of retailers may be significantly greater.

It should also be noted that the selection of retailer by consumer A, B, C, and D (110, 111, 112, and 113) may not be limited to a "participating" retailer as in some of the prior art schemes discussed in the background of the inventions. Coupons generated by SELLECTSOFT™ do not require specialized hardware for the retailer to redeem such coupons. Thus, any retailer who regularly accepts manufacturers coupons may accept coupons generated by SELLECTSOFT™. SELLECTSOFT™ coupons do not appear markedly different than standard printed manufacturer's coupons, and thus the use of SELLECTSOFT™ coupons is "transparent" to the retailer.

However, in an alternative embodiment, coupon data, including consumer ID data may be captured at the point of sale (POS) using scanning equipment or the like. Such techniques may be used where such equipment is already in service and thus significant modifications to a retailer's hardware may not be necessary. Alternately, new scanning hardware and/or software may be incorporated into a next generation of retail bar code scanning equipment to capture and upload SELLECTSOFT™ marketing and coupon data.

In step 124, retailers A, B, C or D (119, 120, 121, or 122) may deposit SELLECTSOFT™ coupons, along with other manufacturer's coupons in a coupon depository. Again, the SELLECTSOFT™ coupons do not appear to the retailer to be any different than standard printed manufacturer's coupons. Thus, no special handling or treatment may be required by the retailer to process such coupons. This latter effect is important, as improved couponing schemes may meet with great resistance if they require extraordinary measures be taken by retailers in order to implement such schemes, or if such schemes require additional time at the checkout stand. As illustrated in FIG. 5, such a depository may be a traditional coupon brokerage clearing house, or may be a specialized SELLECTSOFT™ coupon clearing house.

In step 126, coupon data, including product and consumer ID number, may be read from each redeemed coupon and stored in a data repository portion of the SELLECTSOFT™ database. From this data repository, queries may be made, as illustrated in step 127 to determine which consumers are purchasing which products using SELLECTSOFT™ coupons. In order to provide marketing data to retailers, product manufacturers and the like, a data access mechanism 128 may be provided to allow queries to be made to the SELLECTSOFT™ database via modem dialup, on-line service, or the like.

As illustrated in FIG. 2, the SELLECTSOFT™ database repository 126 may receive additional consumer information through data migration step 123. As illustrated in step 129, additional consumer data may include demographic data received from other sources, lifestyle and psycho graphic information. In addition, list hygiene functions may be performed, as discussed above in connection with FIG. 5 to eliminate redundant entries and update consumer information.

Moreover, the SELLECTSOFT™ database repository 126 may be utilized to authorized coupons in real time at a retail location in a similar manner to credit card or check approval. A coupon may be scanned electronically and data uploaded to the SELLECTSOFT™ database for authorization. If a consumer attempts to redeem too many of a particular coupon, authorization to redeem such coupons may be denied. This same process may also be applicable to gift certificate or gift check redemption.

As illustrated in Step 125, SELLECTSOFT™ data may be managed for further distribution or resale. As noted earlier, accurate demographic information is highly valuable to marketing groups, retailers, and product manufacturers.

As illustrated in step 130, SELLECTSOFT™ mailing lists may be resold (list & management resale) or database information may be resold (database management & resale). Alternately, aggregate data (research and reporting) may be sold, indicating consumer trends or the like. Retention/Relationship Programs may be generated (e.g., club or membership card or the like) from SELLECTSOFT™ data, and/or point of sale data promotions may be created.

Retailers 132 may access the SELLECTSOFT™ database to determine which products in their region or demographic mix may be popular or may need further promotion. Product manufacturers, marketers, and the like 131 may also use the SELLECTSOFT™ database to determine product sales versus demographic data or the like. The Query monitoring/governing software 127 may allow retailer 132 or product manufacturer 131 to produce a number of queries on SELLECTSOFT™ data based on any combination of criteria stored in the SELLECTSOFT™ database. Query monitoring/governing software 127 may meter such queries on a cost per query or on-line connect time basis so that retailers 132 of product manufacturers 131 may be charged for such data queries. Further, query monitoring/governing software 127 may be provided with lockout or security features to prevent unauthorized access to an individual consumer's file so as to prevent unnecessary invasion of privacy.

Although discussed above in terms of diskette storage and mailing, it should be appreciated that other techniques for distribution and authorization may be utilized within the spirit and scope of the present invention. Coupon data may be transmitted via Internet or Internet World Wide Web (WWW) or through on-line services or on-line services providing access to the Internet. Similarly, dialup access may be provided via modem or the like.

Moreover, SELLECTSOFT™ diskette 310 may be substituted with other types of data storage media, including but not limited to CD-ROM, smart card, flash EPROM, PCMCIA card, or the like. CD-ROMs in particular may provide additional storage capacity to store a large number of coupons and/or advertising and promotional materials including so-called multimedia displays or the like (e.g., video advertisements).

Figure 8:
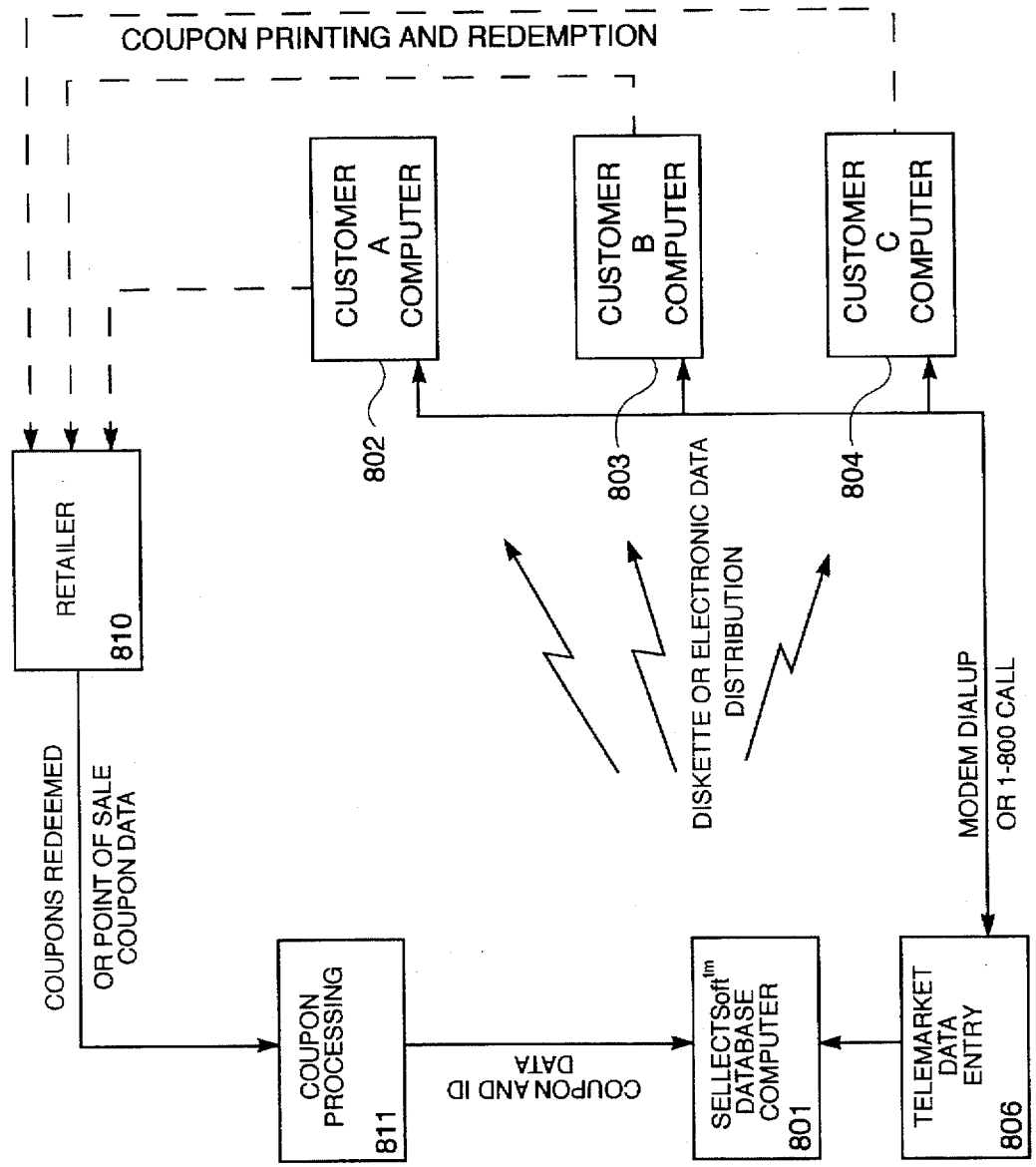
FIG. 8 is a block diagram of illustrating the operation of the system and method of the present invention.

FIG. 8 illustrates the flow of data from the various computers used in the present invention. As illustrated in FIG. 8, SELLECTSOFT™ database computer 801 may generate a package of coupon data for distribution to consumer computer 803–804. SELLECTSOFT™ database computer may comprise a computer, computers, or network of computers or the like. The package of coupon data may be distributed to consumer computers 802–804 via mailing of diskette as discussed above, or by other means (e.g., modem dialup, Internet, on-line service, ISDN, or other data transmission scheme).

Consumer computers 802–804 may typically comprise a home computer, PC or the like, such as an IBM™ compatible PC capable of running Windows™ software. Consumer computers 802–804 may receive demographic and/or identification data from respective consumers and communicate such data to SELLECTSOFT™ database computer 801 vial telemarketing data entry 806. Alternately, demographic and/or identification data may be communicated verbally via a 1-800 call as discussed above. In response, to transmission of demographic and/or identification data, validation data may be transmitted to consumer computers 802–804 to allow for printing of coupons from the package of coupon information.

Coupons may be embedded with a bar code indicating the identification of an individual consumer along with the consumers name printed on the face of the coupon. Bar code data may be transmitted back to the SELLECTSOFT™ database computer 811 when coupons are redeemed at retailer 810. Bar code data may be transmitted manually by sending redeemed coupons to coupon processing clearing house 811, or by electronically transmitting such data using a point of sale bar code data. Coupon processing clearing house 811 may then transmit coupon redemption data and consumer ID data to SELLECTSOFT™ database computer 801.

Note that data generated in the SELLECTSOFT™ system may be fed-back to the SELLECTSOFT database computer 801. This feed-back technique provides for increased marketing and demographic data accuracy and further reduces instances of fraud or abuse of coupons.

Figure 9:
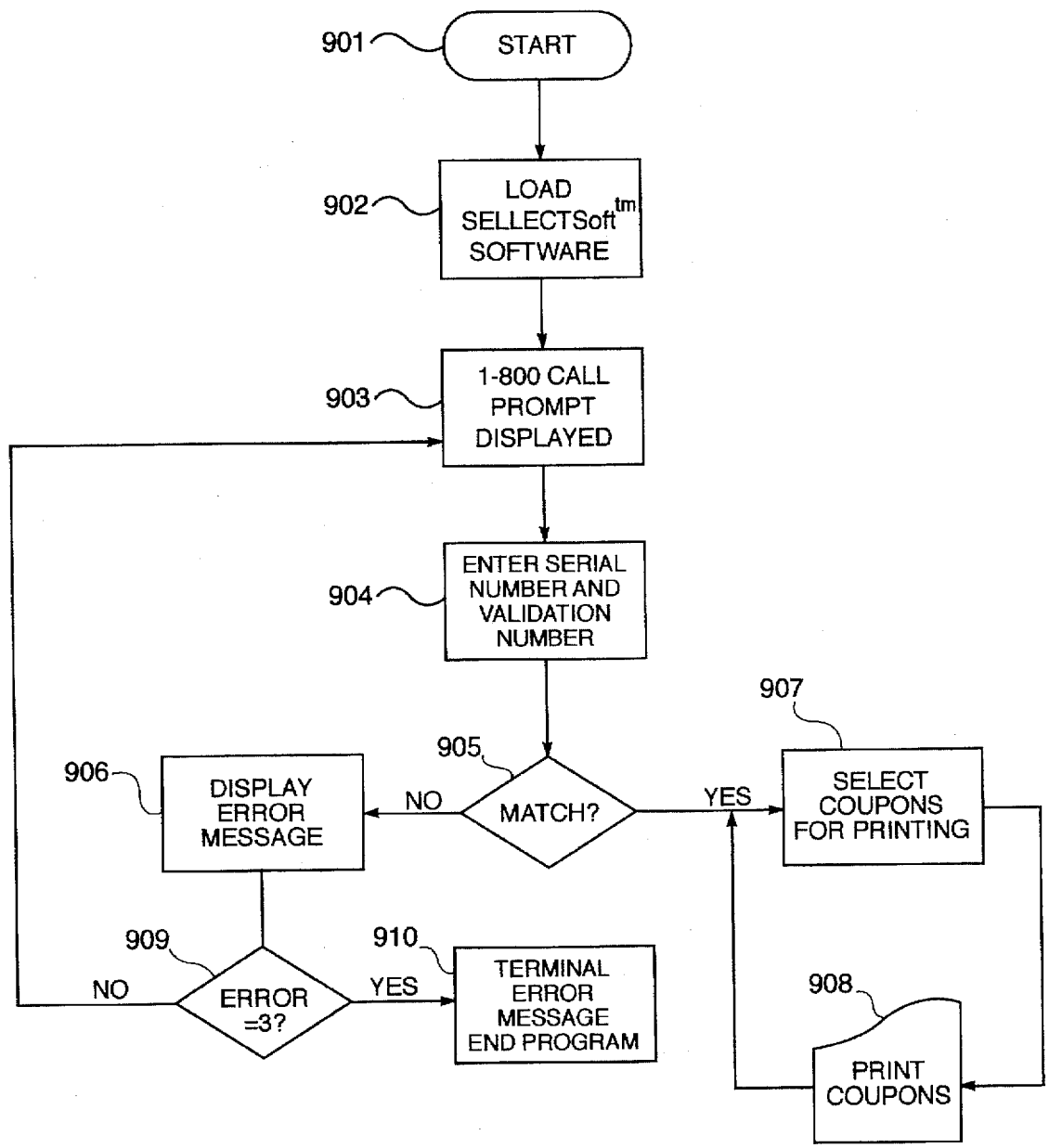
FIG. 9 is a flowchart illustrating the operation of the consumer software portion of the present invention.

FIG. 9 is a simplified diagram illustrating the step in the operation of the SELLECTSOFT™ software in a consumer's computer. As illustrated in FIG. 9, the process starts at START step 901. At step 902, the consumer loads the SELLECTSOFT™ software into his or her computer memory and executes the program. In step 903, a screen may prompt the consumer to call a 1-800 voice or audiotext number to provide demographic and identification information and receive a validation number. As part of the validation process, the consumer may provide the serial number of the SELLECTSOFT™ diskette to the 1-800 operator or audiotext system.

In step 904, a validation number provided by the 1-800 operator or audiotext system may be entered into the consumer's computer, along with name and address information and the SELLECTSOFT™ diskette 310 serial number, as illustrated in FIG. 11. The validation number may then be combined with the SELLECTSOFT™ serial number to produce a code number. This unique code number may then be compared with a code number stored on the SELLECTSOFT™ diskette as illustrated in step 905. If a match occurs, processing passes to step 907 and a consumer may select coupons for printing. Coupons may then be printed as illustrated in step 908. When coupons are printed, the consumer may return to step 907 to select additional coupons, or terminate the program.

If the code numbers do not match, as determined in step 905, processing passes to step 906 and an error message is displayed. In step 909, a determination is made whether a predetermined number of errors have occurred (e.g., 3). If more than the predetermined number of errors have occurred, processing may be halted and an additional error message displayed as illustrated in step 910. Otherwise, processing may return to step 903 and the consumer may again be prompted to call the 1-800 number.

This retry scheme may allow for user mishap while preventing an unlimited number of retrys to reduce or prevent fraud.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A series of operational steps to be performed with the aid of a computer for distributing and generating coupons, comprising the steps of:

generating in a first computer a database comprising at least a list of consumer names and addresses, generating in the first computer a package of data for a selected group of consumers from the list, the package of data including at least one coupon data, transmitting from the first computer the package of data to computers of the selected group of consumers from the list, entering, in the first computer, identification data received from a consumer from the selected group of consumers, transmitting to a computer of the consumer a validation code so as to allow the computer of the consumer to generate at least one coupon from the at least one coupon data in the package of data, generating in the computer of the consumer, in response to a command input by a consumer, at least one coupon from the at least one coupon data in the package of data, the at least one coupon including at least a consumer identification number derived from the validation code, processing, in the first computer, the at least one coupon when the at least one coupon has been redeemed, to retrieve the at least customer identification number, and updating, in the first computer, the database from information retrieved from said processing step to indicate whether a consumer has redeemed the at least one coupon.

2. The series of operation steps of claim 1, wherein said step of transmitting from the first computer the package of data to computers of the selected group of consumers from the list further comprises the steps of:

generating a plurality of diskettes each containing the package of data, and loading the package of data from one of the plurality of diskettes to a computer of a consumer of the selected group of consumers.

3. The series of operation steps of claim 1, wherein said step of transmitting from the first computer the package of data to computers of the selected group of consumers from the list further comprises the step of:

downloading, over a computer network, the package of data to a computer of a consumer.

4. The series of operation steps of claim 1, further comprising the steps of:

counting, in the first computer, the number of times a consumer has redeemed a given coupon, and indicating fraud if the number of times a coupon is redeemed by the consumer exceeds a predetermined amount.

5. The series of operation steps of claim 1, wherein the consumer identification number is imprinted on the at least one coupon with a bar code, said series of operation steps further comprising the steps of:

reading the consumer identification number bar code from the at least one coupon using a scanning device, and outputting the read consumer identification number to the database in the first computer.

6. The series of operation steps of claim 1, wherein said step of processing, in the first computer, the at least one coupon when the at least one coupon has been redeemed, to retrieve the at least customer identification number further comprises the step of retrieving coupon redemption data from the at least one coupon.

7. The series of operation steps of claim 1, further comprising the steps of:

generating, in the first computer, in response to information retrieved from said processing step to indicate whether a consumer has redeemed the at least one coupon, a revised database comprising at least a revised list of consumer names and addresses whose have redeemed predetermined at least one coupon, generating in the first computer a revised package of data for a revised selected group of consumers from the revised list, the revised package of data including at least one coupon data, and transmitting from the first computer the revised package of data to computers of the revised selected group of consumers from the list.

8. The series of operation steps of claim 1, further comprising the steps of:

comparing, in the first computer, the demographic and identification data received from a consumer with corresponding demographic and identification data from the list of consumer names and addresses, generating, in the first computer, a risk score based upon correspondence between demographic and identification data and received from a consumer with corresponding demographic and identification data from the list of consumer names and addresses, and transmitting a validation code to the computer of the consumer if the risk score is greater than a predetermined value.

9. A computer-readable memory for directing a computer to function in a particular manner when used by the computer, comprising:

a first portion for storing coupon image data in a compressed format;

a second portion for directing the computer to prompt a consumer to contact a coupon distributor to receive a validation code;

a third portion for directing the computer to receive as input a validation code;

a fourth portion for directing the computer to compare an authorization code with a stored code; and a fifth portion for directing the computer to print stored coupon images if the authorization code and stored codes match, said coupon images including a consumer code identifying the consumer, the consumer code derived from the validation code.

10. The computer-readable memory of claim 9, wherein said fifth portion further comprises:

a sixth portion for directing the computer to display stored coupon images;

a seventh portion for directing the computer to allow input from the consumer to select one or more of the displayed coupon images; and an eighth portion for directing the computer to print selected displayed coupon images.

11. A system for distributing and generating and redeeming coupons and generating coupon redemption and marketing data, comprising:

a first computer including a database comprising at least a list of consumer names and addresses for generating a package of data for a selected group of consumers from the list, the package of data including at least one coupon data;

first transmitting means, for transmitting from the first computer the package of data to computers of the selected group of consumers from the list;

data entry means, for entering in the first computer demographic and identification data received from a consumer from the selected group of consumers;

second transmitting means, for transmitting from the first computer to a computer of the consumer a validation code so as to allow the computer of the consumer to generate at least one coupon from the at least one coupon data in the package of data;

first generating means, for generating in the computer of the consumer, in response to a command input by a consumer, at least one coupon from the at least one coupon data in the package of data, the at least one coupon including at least a consumer identification number derived from the validation code; and processing means for processing the at least one coupon when the at least one coupon has been redeemed, to retrieve the at least customer identification number, wherein the first computer updates the database from information retrieved from the processing means indicating whether a consumer has redeemed the at least one coupon.

12. The system of claim 11, wherein said first transmitting means further comprises means for storing the package of data on each of a plurality of diskettes.

13. The system of claim 11, wherein said first transmitting means further comprises a computer network for downloading the package of data to a computer of a consumer.

14. The system of claim 11, further comprising:

means for counting, in the first computer, the number of times a consumer has redeemed a given coupon, and fraud indication means for indicating fraud if the number of times a coupon is redeemed by the consumer exceeds a predetermined amount.

15. The system of claim 14, wherein the consumer identification number is imprinted on the at least one coupon with a bar code, said system further comprises:

a scanning device for reading the consumer identification number bar code from the at least one coupon, and output means for outputting the read consumer identification number to the database in the first computer.

16. The system of claim 15, wherein processing means retrieves coupon redemption data from the at least one coupon.

17. The system of claim 16, further comprising:

second generating means, in the first computer, for generating in response to information retrieved from said processing means, an indication whether a consumer has redeemed the at least one coupon, revising the database to comprise at least a revised list of consumer names and addresses whose have redeemed predetermined at least one coupon; and third generating means, in the first computer, for generating a revised package of data for a revised selected group of consumers from the revised list, the revised package of data including at least one coupon data, wherein said first transmitting means further transmits from the first computer the revised package of data to computers of the revised selected group of consumers from the list.

18. The system of claim 17, further comprising:

a comparator, in the first computer, for comparing the demographic and identification data received from a consumer with corresponding demographic and identification data from the list of consumer names and addresses; and fourth generating means for generating, in the first computer, a risk score based upon correspondence between demographic and identification data and received from a consumer with corresponding demographic and identification data from the list of consumer names and addresses, wherein said second transmitting means transmits a validation code to the computer of the consumer if the risk score is greater than a predetermined value.

19. A series of operational steps to be performed with the aid of a computer for distributing and generating coupons, comprising the steps first, generating in a first computer a database comprising at least a list of consumer names and addresses, second, generating in the first computer a package of data for a selected group of consumers from the list, the package of data including at least one coupon data, third, transmitting from the first computer, the package of data to computers of the selected group of consumers from the list, fourth, prompting a consumer to provide demographic and identification data to the first computer, fifth, entering, in the first computer, demographic and identification data received from a consumer from the selected group of consumers, sixth, transmitting to a computer of the consumer, in response to received demographic and identification data, a validation code so as to allow the computer of the consumer to generate at least one coupon from the at least one coupon data in the package of data, seventh, generating in the computer of the consumer, in response to a command input by a consumer, at least one coupon from the at least one coupon data in the package of data, the at least one coupon including at least a consumer identification number derived from the validation code, eighth, processing, in the first computer, the at least one coupon when the at least one coupon has been redeemed, to retrieve the at least customer identification number, and ninth, updating, in the first computer, the database from information retrieved from said processing step to indicate whether a consumer has redeemed the at least one coupon.

\* \* \* \* \*